US010302110B2

(12) United States Patent
Johnson

(10) Patent No.: US 10,302,110 B2
(45) Date of Patent: May 28, 2019

(54) SPRING CLAMP FOR CONSTRUCTION OF PLANT CAGES AND TRELLISES

(71) Applicant: Alan Lee Johnson, Pine River, MN (US)

(72) Inventor: Alan Lee Johnson, Pine River, MN (US)

(*) Notice: Subject to any disclaimer, the term of this patent is extended or adjusted under 35 U.S.C. 154(b) by 259 days.

(21) Appl. No.: 15/440,765

(22) Filed: Feb. 23, 2017

(65) Prior Publication Data

US 2017/0261019 A1 Sep. 14, 2017

Related U.S. Application Data

(60) Provisional application No. 62/305,291, filed on Mar. 8, 2016.

(51) Int. Cl.
*A01G 9/12* (2006.01)
*F16B 2/24* (2006.01)
*F16B 7/04* (2006.01)

(52) U.S. Cl.
CPC .............. *F16B 7/0493* (2013.01); *A01G 9/12* (2013.01); *F16B 2/241* (2013.01)

(58) Field of Classification Search
CPC .. A01G 9/12; A01G 17/06; F16B 7/04; F16B 7/0493; F16B 2/20; F16B 2/24; F16B 2/241
See application file for complete search history.

(56) References Cited

U.S. PATENT DOCUMENTS

| | | | |
|---|---|---|---|
| 1,505,220 A | 10/1923 | Shay | |
| 2,015,026 A | 9/1935 | Barrows | |
| 2,152,018 A * | 3/1939 | Barnhart | A01G 9/12 248/27.8 |
| 2,476,427 A | 7/1949 | Melvin et al. | |
| 2,851,823 A * | 9/1958 | Peterson | A01G 9/128 248/122.1 |
| 2,968,850 A * | 1/1961 | Tinnerman | A47B 57/56 248/316.7 |
| 3,004,370 A * | 10/1961 | Tinnerman | F16B 2/245 24/326 |
| 3,233,297 A * | 2/1966 | Havener | E04B 9/205 248/125.1 |
| 3,562,873 A * | 2/1971 | Cumber | F16B 2/246 403/397 |
| 3,617,076 A * | 11/1971 | Attwood | E01F 13/02 256/13.1 |
| 4,048,752 A | 9/1977 | Anderson | |
| D261,853 S | 11/1981 | Gigante | |
| 4,309,120 A * | 1/1982 | Werthmann | F16B 2/246 16/DIG. 25 |
| 4,357,884 A | 11/1982 | Rast, Jr. | |

(Continued)

FOREIGN PATENT DOCUMENTS

DE 4037844 A1 * 6/1992 ............... E03C 1/23
DE 202009004679 * 8/2009
(Continued)

*Primary Examiner* — Jonathan P Masinick
(74) *Attorney, Agent, or Firm* — Boyle Fredrickson, S.C.

(57) ABSTRACT

A thin, flat, generally rectangular form, constructed of resilient material forming a spring plate clamping device for the removable attachment of horizontal plant support rods onto upright stakes, thereby facilitating the construction of plant cages to support and protect vegetation.

12 Claims, 3 Drawing Sheets

(56) References Cited

U.S. PATENT DOCUMENTS

| | | | |
|---|---|---|---|
| D299,307 S | 1/1989 | Finnigan | |
| 5,035,384 A * | 7/1991 | Werthmann | E01C 19/008 24/339 |
| 5,067,274 A | 11/1991 | Lewis | |
| 5,279,073 A | 1/1994 | Czebieniak | |
| 5,323,559 A | 6/1994 | Allman | |
| 5,335,448 A | 8/1994 | Martinez et al. | |
| 5,440,834 A | 8/1995 | Kleinert | |
| 5,542,210 A | 8/1996 | Hupfl | |
| 5,544,446 A | 8/1996 | Benson, Jr. | |
| 5,595,019 A | 1/1997 | Foreman | |
| 5,598,682 A * | 2/1997 | Haughian | E04C 5/163 52/745.21 |
| 6,000,172 A | 12/1999 | Ballarino | |
| 6,065,899 A | 5/2000 | Adams et al. | |
| 6,401,385 B1 | 6/2002 | Kleinert | |
| 6,453,606 B1 | 9/2002 | Shulman et al. | |
| 6,484,330 B2 | 11/2002 | Gray et al. | |
| 6,679,299 B1 * | 1/2004 | Hitchin | E04C 5/167 140/11 |
| 6,912,809 B2 | 7/2005 | Malofsky et al. | |
| 6,928,772 B2 | 8/2005 | Bai et al. | |
| 7,017,299 B1 | 3/2006 | Speed et al. | |
| 7,043,876 B2 | 5/2006 | LaPelusa | |
| 7,178,776 B2 * | 2/2007 | Buck | F16L 3/1008 174/541 |
| 7,219,467 B1 | 5/2007 | Branman | |
| 7,281,352 B2 | 10/2007 | Peck | |
| 7,331,140 B1 | 2/2008 | Mason | |
| 7,735,259 B2 | 6/2010 | Rich et al. | |
| 8,006,434 B2 * | 8/2011 | Allsop | A01G 9/12 47/47 |
| 8,407,829 B2 * | 4/2013 | Vogel | A47K 1/14 4/689 |
| 9,851,108 B2 * | 12/2017 | Pille | F24C 15/108 |
| 9,907,397 B2 * | 3/2018 | Choi | A47B 57/54 |
| 2013/0269246 A1 | 10/2013 | Kassouni | |
| 2014/0026409 A1 * | 1/2014 | Liu | B25B 31/00 29/811.2 |
| 2015/0076304 A1 * | 3/2015 | Hattori | F16B 21/075 248/231.81 |
| 2015/0136940 A1 * | 5/2015 | Moreno | F16M 13/02 248/634 |
| 2015/0260207 A1 * | 9/2015 | Ligon | F16B 7/0493 24/459 |
| 2015/0289454 A1 | 10/2015 | Legus et al. | |
| 2018/0007843 A1 * | 1/2018 | Fakhari | A01G 9/12 |

FOREIGN PATENT DOCUMENTS

| | | | |
|---|---|---|---|
| FR | 2661221 A1 * | 10/1991 | A01G 17/08 |
| FR | 2836780 * | 9/2003 | |
| GB | 449978 A * | 7/1936 | A01G 9/12 |
| GB | 2147485 * | 5/1985 | |

* cited by examiner

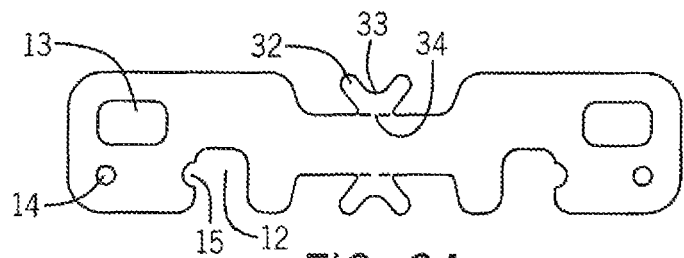
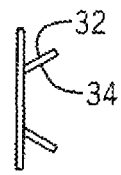
FIG. 3A          FIG. 3B
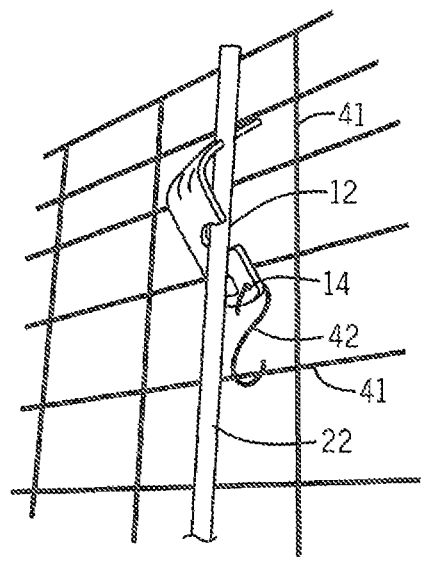
FIG. 4A
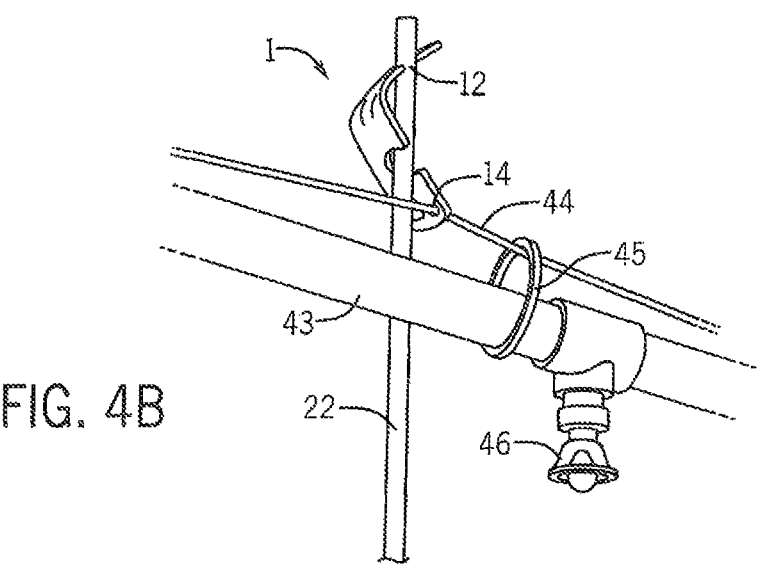
FIG. 4B

SPRING CLAMP FOR CONSTRUCTION OF PLANT CAGES AND TRELLISES

CROSS-REFERENCE TO RELATED APPLICATIONS

This application claims the benefit of provisional patent application Ser. No. 62/305,291 filed Mar. 8, 2016 and hereby incorporated by reference.

BACKGROUND

The present invention relates to plant support cages and in particular to a kit for rapidly assembling cages in a variety of configurations from standard stakes.

Gardeners have long known the advantages of supporting the fruit bearing vegetation of tomato plants and other plants such as peas, cucumbers, and beans, to name a few. Providing support for these types of plants serves several functions. It keeps the fruit from contact with the ground where diseases and insects have ready access to the produce. Support also relieves the stress on heavily laden branches and vines. In some cases, proper support exposes the foliage to advantageous access to sunlight and ventilation. Fruit and vegetables that are restrained from contact with the ground stay much cleaner and are visually more appealing.

Numerous devices have been developed to provide the support described above. Funnel shaped wire cages for tomatoes are a common example—see U.S. Pat. No. 7,874,100 (2011) for example. Many types of square cages have been designed—see US 2014/0109474 (A1) for example. Indeterminate tomato plants are sometimes suspended by a cord which is wrapped around the vines or attached to them with clips, plastic ties, or ribbons—see U.S. Pat. No. 6,928,772 for example.

All of the plant support structures heretofore known suffer from one or more disadvantages. Some prior art teaches very complicated structures. Many show a complicated folding mechanism to facilitate storage. A number of plant support cages and devices on the market are expensive and are capable of supporting only one plant. Some of the most widely distributed designs have fallen into disfavor with many gardeners due to: the propensity to fall over when laden with heavy fruit or when subjected to windy conditions; difficulty reaching through the structure to harvest the fruit; difficulty cleaning out the vegetation at the end of the season; difficulty storing due to size and shape; lack of quality or durability; and/or high purchase price.

SUMMARY

The present invention provides a spring clamp that can be used to join orthogonal poles together to form plant support cages from readily available garden stakes. Additional features allow for support of wire fencing irrigation lines and the like.

Specifically in one embodiment, the invention provides a spring clip comprising a body formed of a metal sheet having opposed left and right sides extending along a length between first and second ends at least one side including two notches spaced along the length, the metal sheet adapted to be elastically flexible across the length so that the notches may grip and retain a first pole extending downwardly through a first notch and upwardly through the second notch to capture a second pole between die first pole and a portion of the sheet between the notches extending perpendicularly to the first pole.

It is thus a feature of at least one embodiment of the invention to provide a simple clamp that can aid gardeners in creating a variety of different types of garden structures for supporting plants with crossing poles.

The spring clip may further include at least a first aperture for receiving a third pole through the first aperture oriented orthogonally to the first and second poles.

it is thus a feature of at least one embodiment of the invention to permit the connection of orthogonal poles to create rigid structures of arbitrary dimension.

The spring clip may further include a second aperture proximate to the second end.

It is thus a feature of at least one embodiment to resist undesired flexing of the spring clip under the weight of attachment for different orientations of the spring clip.

The spring clip may further include third and fourth apertures proximate to the first and second ends and smaller than the first and second apertures.

It is thus a feature of at least one embodiment of the invention to provide for the attachment of additional lines or hooks using the spring clamps.

Each of the notches and first apertures may be sized to receive a pole of at least ⅜ inch in diameter and two elastically clamp the first and second poles.

It is thus a feature of at least one embodiment of the invention to work with standard garden stakes to provide for robust interconnection.

The spring clip may include a narrow waist section positioned between the first and second ends to promote flexure at the narrow waist section.

It is thus a feature of at least one embodiment of the invention to permit the flexibility of the clamp to be adjusted independently of the area of the clamp necessary to provide for adequate support notches and the like.

The spring clip may include at least one outwardly extending bifurcated tab having opposed branches splaying away from each other as they extend outwardly.

It is thus a feature of at least one embodiment of the invention to make use of the waist area for additional connection points without unduly effecting flexibility.

The metal sheet of the spring damp in a relaxed state, may be arcuate in a plane perpendicular to a broad surface of the metal sheet extending between the first and second ends.

It is thus a feature of at least one embodiment of the invention to pre-flex the spring damp to reduce the amount of force required by the user to assemble a cage structure.

The notches may provide opposed walls extending inward from the side of the metal sheet and wherein at least one wall includes a secondary notch extending inwardly from the wall along the length of the metal sheet.

It is thus a feature of at least one embodiment of the invention to introduce sharp notch corners to retain and center the polls in the notches.

The spring clip of claim 1 wherein the sheet is less than eight inches long between the first and second end and three inches wide between the left and right sides.

Several advantages of one or more embodiments of the invention include: providing an inexpensive damp which is utilized to construct a plant cage or trellis utilizing stakes and rods as a means to provide a support structure for plants, as a safeguard for foliage and fruit, that can be adapted to plant size during various growing stages, that is economical to manufacture and distribute, that provides easy and intuitive assembly and dis-assembly, that can be stored in the off season in a minimum of space, that can be adapted to form support structures of varied configurations, and can utilize inexpensive 'off-the-shelf' components of various sizes for the support members. Other advantages of one or more aspects will be apparent from a consideration of the drawings and ensuing description.

BRIEF DESCRIPTION OF THE FIGURES

FIG. 3A is a top view illustrating an additional embodiment of this invention. The grip tabs 32 are shown before being bent into position.

FIG. 3B is an end view showing the relative position of grip tab 32 after bending.

FIG. 4A shows the top portion of stake 22 and fence panel 41 to illustrate how hook aperture 14 can be utilized to suspend a fence panel to make a trellis.

FIG. 4B shows clamp 1 attached to a tall stake to illustrate how a cable running though hook aperture 14 can be utilized to suspend an overhead irrigation system.

DETAILED DESCRIPTION

Figure 1:
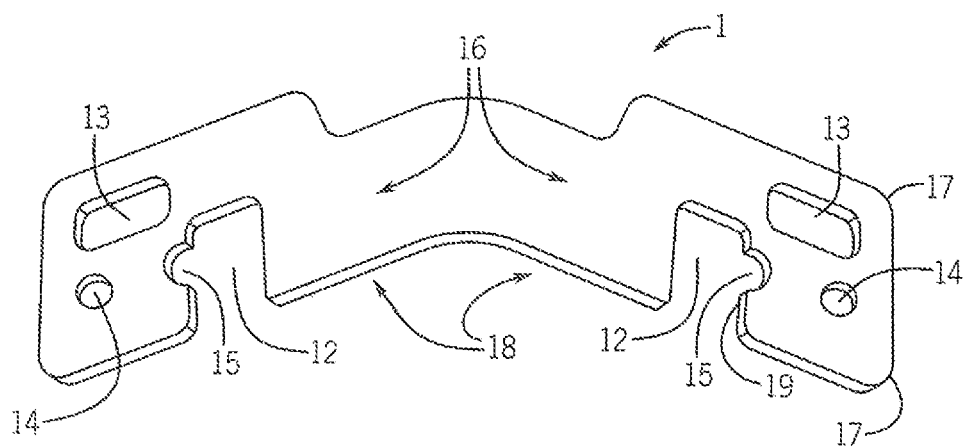
FIG. 1 is a perspective view showing one embodiment of clamp 1.
Figure 2:
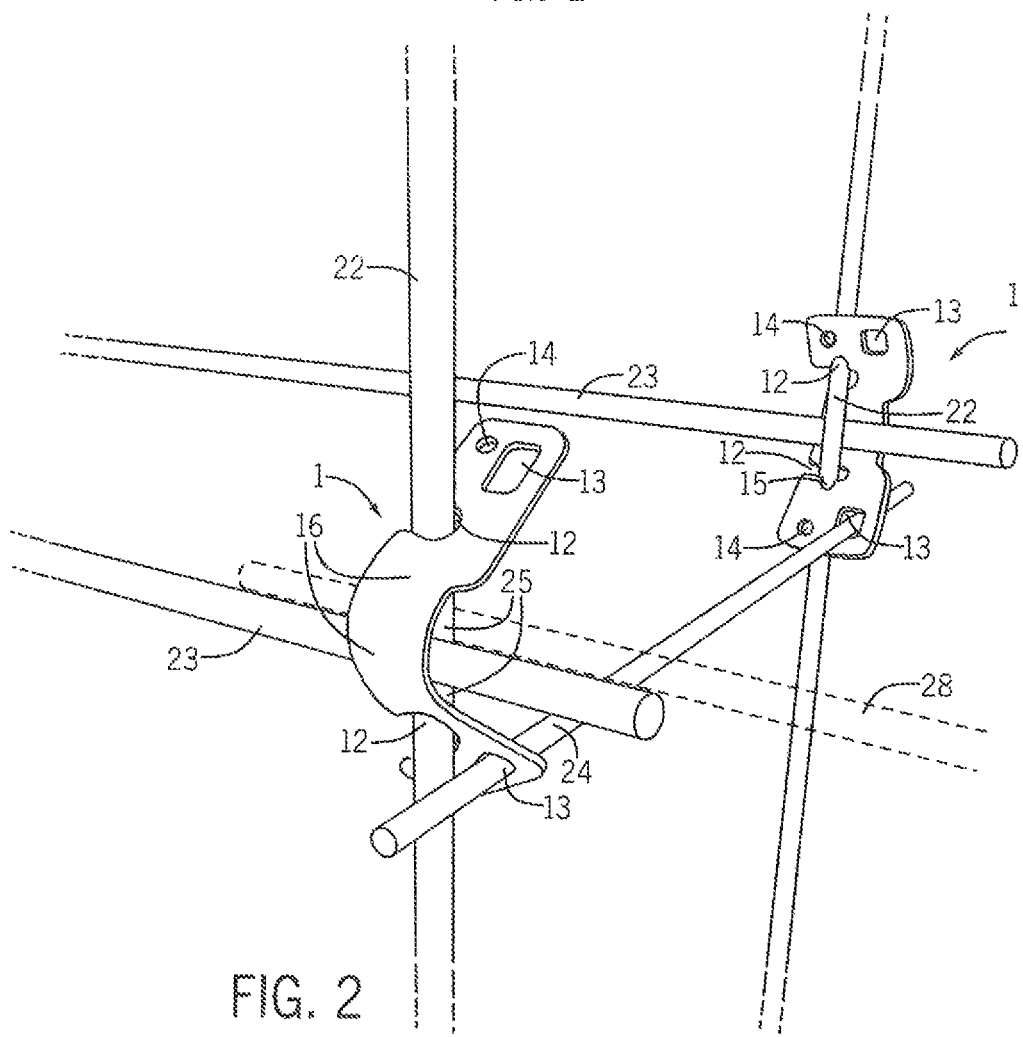
FIG. 2 is a perspective view showing approximately one-half of a typical tomato cage to illustrate the manner in which component parts can be assembled by utilizing clamps of the present invention.

One embodiment of the clamp is illustrated in FIG. 1 (Perspective View) and FIG. 2 (Assembled Plant Cage Partial Perspective View). Clamp 1 is constructed of a thin resilient material such as spring stainless steel or pre-plated steel having a thickness of less than ¹⁄₁₆ of an inch or approximately ¹⁄₃₂ of an inch. In this embodiment, the opposing ends of the clamp are mirror images. Each end has a stake aperture 12, a cross support aperture 13, a hook aperture 14, and a retention notch 15.

The central section has a tension area 16, which flexes to provide the spring action that binds the clamp to a rod or elongated member such as a stake. The tension force is controlled by the thickness of the material, the width and length of tension area 16, and the material's resilience.

In this embodiment, a bend 18 forms an approximate 120 degree angle on the longitudinal center-line axis of the clamp. This bend facilitates the attachment of the clamp to a stake or rod. The bend also affects the size and shape of the opening described as receiving gap 25, as illustrated in FIG. 2. A sharper bend will produce a larger receiving gap 25. The clamp functions well without the bend, however it is slightly harder to attach to a stake without it. All outside corners 17 of the clamp are rounded to avoid snagging.

FIG. 2 illustrates the manner in which the above features of the clamp are utilized to construct a typical plant cage from orthogonal poles including two Vertical poles and two horizontal poles in a first direction and a third horizontal pole perpendicular to the two horizontal poles. Two stake apertures 12 capture stake 22. Spring tension supplied by the resilient material of the clamp hinds the edges of each stake aperture 12 against the stake to hold it firm by frictional resistance.

Retention notch 15 provides additional resistance to disengagement of stake aperture 12 from the stake. Retention notch 15 can accomplish its stated purpose in two ways. In one way the sharp corners form grip points 19 which bite into the stake, thereby providing additional resistance to lateral movement which could disengage the clamp from the stake.

Another way to reduce the likelihood of disengagement is to configure retention notch 15 so that it is sized to 'nest' around the stake to partially encapsulate it thereby resisting lateral disengagement forces.

FIG. 2 illustrates the function of cross support aperture 13. Cross support 24 is attached by engagement into cross support aperture 13.

FIG. 4A and 4B illustrates the function of hook aperture 14. FIG. 4A shows one end of 'S' hook 36 engaged in hook aperture 14 and the other end of the 'S' hook suspending a welded wire fence panel 38 for the purpose of supporting a vining plant. FIG. 4B illustrates the manner in which hook aperture 14 is used to suspend a cable. The cable is then used to suspend a sprinkler pipe above the ground by attaching it with cable ties 45, in this example. See FIG. 4B.

Additional embodiments are shown in FIG. 3. Grip tab 32 is formed as a contiguous projection from the body of the clamp. A second grip tab is illustrated on the opposed side of the clamp, although for some applications, only one tab is necessary. Tab retention notch 33 lies on the outboard portion of the grip tab. Bend line 34 indicates the location of a bend that can vary from 90 degrees to approximately 120 degrees in relation to the lateral plane of the clamp body. The purpose of the grip tab is to engage the lateral support 23 with applied pressure to inhibit its shifting of position relative to the clamp. Grip tab 32 and corresponding tab retention notch 33 can be sized to conform to a small diameter wire or to a larger diameter rod such as a concrete reinforcing bar. It is hereby noted that the embodiment of a grip tab will affect the bend profile of tension area 16, which thereby dictates a preference for a relatively narrow width of the grip tab at the location of bend line 34.

An additional purpose of grip tab 32, or similar projection, is to discourage 'nesting' (aligning so that they fit closely with another) in a tumbling process performed to plate or debur. Parts that tend to 'nest' when tumbled must, instead, be individually racked for plating, which adds considerable cost.

Figure 6:
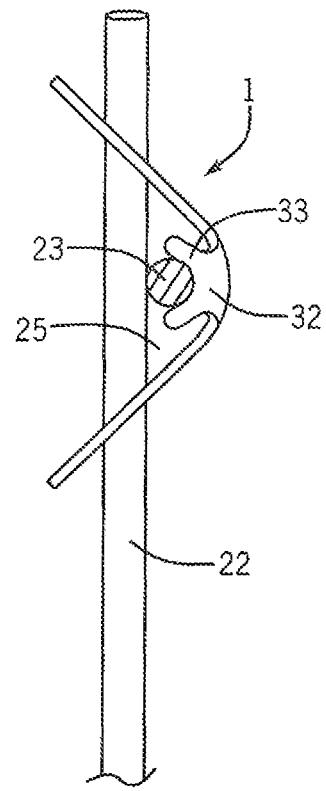
FIG. 6 is a side view of clamp 1 attached to a stake with grip tab 32 in contact with a lateral support 23.

The clamp and corresponding features can be 'scaled up' Or 'sealed down' to accommodate a wide variety of sizes and shapes of elongated members, including wires, rods, pipes, tubes, bars, and stakes. This clamp can function equally well with square stakes and rods as well as round ones. Although this invention's primary application is for plant cages and trellises, it should not be construed to be limited to those purposes. For example, spring clamps configured to specifications of the ensuing claims may find application in the construction of rebar structures for the reinforcement of concrete. See FIGS. 3A, 3B, and 6 for the preferred embodiment for assembling rebar structures.

Figure 5:
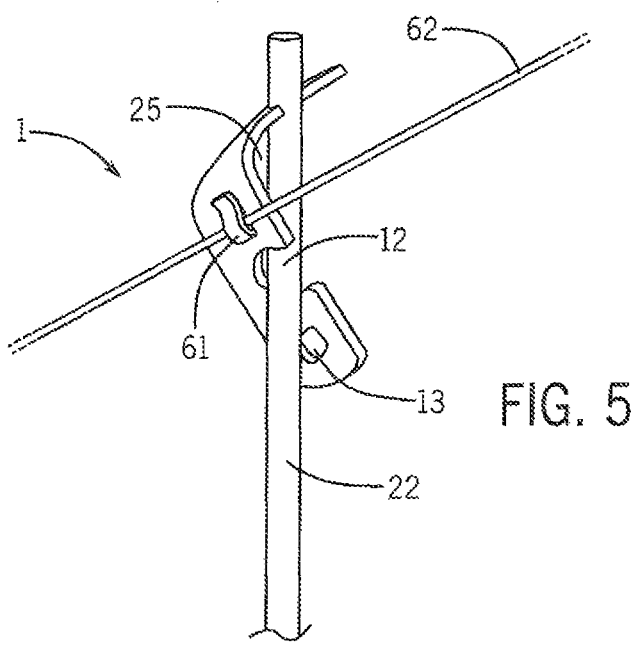
FIG. 5 shows how wire tab 37 can be used to attach a trellis training wire 35 to clamp 1.

This clamp, as specified in the claims and as illustrated in FIG. 5, also has application in the construction of vineyard trellises for attachment and support of training wires. FIG. 5 illustrates an embodiment consisting of wire tab 61, which can be formed in the stamping process by displacing a portion of the clamp material to form a tab which can capture trellis training wire 62. In the stamping process, the tab can be sheared from the clamp material on three sides and displaced slightly, leaving the tab attached on the forth side to the clamp body. In this embodiment, a wire can be inserted directly into the slot formed between the tab and the clamp body. The wire tab can easily be bent over the wire with pliers for a more secure attachment. The trellis training wire could be loosely captured in receiving gap 25, however this method does not help to stabilize stake 22. When the trellis training wire is securely captured by the wire tab, it helps prevent the stake from tilting sideways, which can be a problem, especially during windy conditions.

Another embodiment entails constructing the clamp without pre-forming bend 18 (FIG. 1) in the manufacturing process. The bend can be formed in the process of attaching the clamp to a stake or rod, as described in the following "Operations" section. In this embodiment, the clamp is slightly harder to attach to a stake. However, eliminating the pre-formed bend results in a reduction in manufacturing costs.

Advantages

The disclosed spring clamp has many advantages over the prior art:

It is simple and inexpensive to manufacture.

The side notch configuration permits assembly of components without 'threading' through an aperture. This damp can be attached directly to any location on a post or rod.

It provides quick and intuitive assembly of a wide range of structures.

The spacing of the stakes during construction of the cage is not critical because there is considerable latitude in the capture point of the support members which are attached to the clamps. This is important because accurate placement of stakes driven into the ground is difficult.

The clamps are simple and quick to connect or disconnect. The flat outward portions of the clamp provide grip 'handles' that facilitate attachment and removal.

Most clamps currently available for horticultural purposes can attach only one rod to a second rod. One clamp of my invention will attach up to three rods to a stake and these rods can be added after attaching the clamp to the stake.

When disassembled, the damps and associated structure components store in a very small space.

The posts and support members which attach to this clamp can be removed from vegetation very easily, without entanglement, thereby expediting garden clean-up at the end of the growing season.

Additional clamps and support members can be added at any time during the growing season. This can be done by 'threading' additional support members through the vegetation or by adding additional support members above the growing plant.

A given size of this damp can attach stakes and support members of varied diameters, thereby permitting the use of standard 'off-the-shelf' garden stakes and supports from various manufacturers, making it very versatile, and providing for the assembly of a support structure using inexpensive, readily available component parts. Even inexpensive bamboo stakes which have varying diameters can be used for the support members. For example,. a clamp of 'typical' size can be attached securely to stakes ranging from ¼ inch to ½ inch in diameter. This clamp can utilize steel rods, plastic coated steel tubes, fiberglass rods, or plastic rods for the stakes and corresponding support members.

The support structure made by utilizing the clamps of this design can he customized for the purpose at hand by locating the support members in an endless variety of configurations.

The clamp will accept support members of substantial diameter (up to ½ inch for the 'standard' size clamp) and, unlike the narrow wire supports of many plant cage designs, the large support members are less likely to damage the vegetation they support. The clamp's size and configuration can be 'up-scaled' to accept even larger stakes and support members or 'scaled down' for small diameter rods and wires.

The clamping pressure of this clamp can be adjusted for various applications in the manufacturing stage by changing the thickness of the material, the width of tension area 16 (FIG. 1), and/or the elasticity/rigidity of the material of which it is constructed.

In addition to stainless steel, this clamp can be made of spring steel, vulcanized fiber, fiber reinforced composites, painted or plated steel strapping, or other resilient materials.

The clamps of my design can be sold independently or sold packaged with stakes and support members for the convenience of the customer. If the clamps are sold independently, the stakes and cross members can be purchased at most garden centers or at 'big box' building centers, which may offer savings to the customer on shipping costs.

As an example of the versatility of this clamp, it can he utilized to construct a 'trellis' structure in addition to a 'cage' structure. A trellis can be constructed by placing the clamps at the top of two or several tall posts which are inserted vertically into the pound. A simple wire 'S' hook can be attached to each clamp. Panels of common welded wire fencing of various designs can be hung from the 'S' hooks to provide support for climbing plants such as cucumbers and peas, thereby providing an economical version of a trellis.

An alternative type of trellis can be constructed by using two upright stakes to which pairs of damps are placed on each stake at frequent intervals, directly opposed to each other. The clamps attach horizontal support members between each opposed pair of clamps, which results in a 'ladder-like' trellis structure.

These clamps can also be used to attach a horizontal support rod to the tops of tall vertical stakes. Cords can be hung from the horizontal support and can be wound around the stems of indeterminate tomatoes or other vining crop.

Warehousing and shipping costs for the clamps would be almost negligible, making it ideal for mail order or internee business. Five thousand damps can be stored in a few cubic feet because they can be 'nested' together. Each 'standard-sized' clamp weighs less than two ounces. Most garden retailers already stock the garden stakes that can be used with the clamps.

Operation

A standard plant cage configuration utilizing this clamp comprises four vertical stakes driven securely into the ground in a rectangular pattern, one clamp on each of the four stakes located approximately one foot off the ground, and a second level of four clamps is positioned about two feet off the ground. Lateral supports 23 and cross supports 24 (see FIG. 2) are attached to the clamps on two levels on each of the four sides.

The preferred method of assembling a plant cage for two or three plants by the utilization of this clamp is as follows:

1) Place four stakes 22—FIG. 2—(of bamboo, fiberglass, plastic, steel, plastic coated steel tube, or wooden dowel construction) vertically about 6 or 8 inches into the ground, one in each corner of an area approximately 14 by 40 inches. Place the plants within this area. The cage can also be assembled around well-established plants.

2) Place a clamp on each stake at a level appropriate for the type of plant to be supported. The clamps are attached by gasping the ends of the clamp and squeezing them together. This aligns the stake apertures 12 so that they slip easily onto the stake by sliding the clamp on sideways. When tension is released, the edges of the stake apertures bind tightly onto the stake. The clamps should be placed on the stake so that they are aligned in a manner that permit lateral support 23 and cross support 24 to be inserted into cross support apertures 13 and receiving gap 25.

3) If the clamp has not had bend 18 pre-formed, the clamp can be attached to a stake as follows: insert stake aperture 12, located on a first end of the clamp, onto a stake. Grasp the second end of the clamp on the portion out bound from the second stake aperture. With the first stake aperture captured on the stake, the second end of the clamp can be bent around to form a shallow 'C' shape. This positions the second stake aperture so that it can capture the stake as illustrated in FIG. 2.

4) Second and third levels of support rods can be added as appropriate for the type of plant growing therein.

5) The clamps can be easily adjusted up or down by grasping the ends of the clamp and squeezing them together to relieve the grip on the stake. In the released position, the clamp can slide up or down the stake to any location thereon.

6) Receiving gap 25 can accommodate two lateral supports 22. FIG. 2 illustrates how a second lateral support can be attached at additional support location 28. In this manner the plant cage can be extended laterally to form a continuous support structure.

The preferred method of assembling a vertical trellis for the propagation of vining plants is illustrated in FIG. 4A. This illustration is a partial perspective view that shows one of the two stakes and clamps that form the structure:

1) Place two rigid stakes, typically ½ inch×7 ft. rebar, thinly into the ground. Attach a clamp near the top of each stake.

2) Place an 'S' hook into hook aperture 14 of each clamp. A panel of standard welded wire fencing is suspended from the 'S' hook to provide a vertical structure onto which vining plants can attach themselves.

A typical method of utilizing clamp 1 for constructing an above ground sprinkler system is illustrated in FIG. 4B. This illustration is a perspective view of one segment of such a system:

1) Begin by driving a series of stakes (½ inch×7 ft. steel rebar) into the ground at approximately 15 ft. intervals along a line centered in the area to be irrigated.

2) Attach a clamp near the top of each stake. Thread a small steel cable 44 into each hook aperture 14, anchor each end of the cable and tension it. Use cable ties 45 or similar to suspend PVC pipe 43 with attached sprinkler heads 46.

I claim:

1. A spring clip comprising a body formed of a metal sheet having opposed left and right sides extending along a length between first and second ends at least one side including two notches spaced along the length, the metal sheet adapted to be elastically flexible across the length so that the notches may grip and retain a first pole extending downwardly through a first notch and upwardly through the second notch to capture a second pole between the first pole and a portion of the sheet between the notches extending perpendicularly to the first pole;

further including at least a first aperture for receiving a third pole through the first aperture oriented orthogonally to the first and second poles.

2. The spring clip of claim 1 wherein the first aperture is proximate to the first end and further including a second aperture proximate to the second end.

3. The spring clip of claim 2 further including third and fourth apertures proximate to the first and second ends and smaller than the first and second apertures.

4. The spring clip of claim 3 wherein the metal sheet in a relaxed state is arcuate in a plane perpendicular to a broad surface of the metal sheet extending between the first and second ends.

5. The spring clip of claim 1 wherein each of the notches and first apertures are sized to receive a pole of at least ⅜ inch in diameter and to elastically clamp the first and second poles.

6. The spring clip of claim 5 wherein the metal sheet includes a narrow waist section positioned between the first and second ends to promote flexure at the narrow waist section.

7. The spring clip of claim 6 wherein the waist section includes an outwardly extending bifurcated tab having opposed branches splaying away from each other as they extend outwardly.

8. The spring clip of claim 6 wherein the waist section includes a cantilevered tab adapted to capture a wire beneath the tab.

9. The spring clip of claim 1 wherein the notches provide opposed walls extending inward from the side of the metal sheet and wherein at least one wall includes a secondary notch extending inwardly from the wall along the length of the metal sheet.

10. The spring clip of claim 1 wherein the sheet is less than eight inches long between the first and second end and three inches wide between the left and right sides.

11. The spring clip of claim 1 therein the sheet is stainless steel having a thickness of less than 1/16 of an inch.

12. A kit for constructing plant cages comprising:

a plurality of spring clamps each comprising a body formed of a metal sheet having opposed left and right sides extending along a length between first and second ends at least one side including two notches spaced along the length, the metal sheet adapted to be elastically flexible across the length so that the notches may grip and retain a first pole extending downwardly through a first notch and upwardly through the second notch to capture a second pole between the first pole and a portion of the sheet between the notches extending perpendicularly to the first pole; and a plurality of first and second poles;

the spring clamps further including at least a first aperture for receiving a third pole through the first aperture oriented orthogonally to the first and second poles.

\* \* \* \* \*